(12) United States Patent
Drewry et al.

(10) Patent No.: US 8,147,117 B2
(45) Date of Patent: *Apr. 3, 2012

(54) WATER TANK DEICING MIXER

(76) Inventors: Kristinn G. Drewry, Bellevue, WA (US); Richard J. Koopmans, Bellevue, WA (US)

( * ) Notice: Subject to any disclaimer, the term of this patent is extended or adjusted under 35 U.S.C. 154(b) by 290 days.

This patent is subject to a terminal disclaimer.

(21) Appl. No.: 12/387,880

(22) Filed: May 8, 2009

(65) Prior Publication Data

US 2009/0279381 A1 Nov. 12, 2009

Related U.S. Application Data

(60) Provisional application No. 61/127,376, filed on May 12, 2008.

(51) Int. Cl.
*B01F 13/02* (2006.01)
(52) U.S. Cl. ........ 366/101; 210/149; 366/106; 366/107; 366/142
(58) Field of Classification Search ................. 366/101, 366/103, 104, 105, 106, 107, 142; 210/85, 210/90, 149; 222/3, 195, 261; 261/96, 121.4, 261/129; 137/3, 4, 5, 593
See application file for complete search history.

(56) References Cited

U.S. PATENT DOCUMENTS

| | | | | |
|---|---|---|---|---|
| 1,295,687 A * | 2/1919 | Bullard | ......................... | 137/339 |
| 2,829,505 A * | 4/1958 | Oates, Jr. | ......................... | 62/154 |
| 3,109,288 A * | 11/1963 | Gross | ............................ | 405/61 |
| 3,148,509 A * | 9/1964 | Laurie | ............................. | 405/22 |
| 3,159,383 A * | 12/1964 | Van Munster | ................. | 366/107 |
| 3,293,861 A * | 12/1966 | Hinde | ............................ | 405/61 |
| 3,318,098 A * | 5/1967 | Hoddinott et al. | .............. | 405/61 |
| 3,592,450 A * | 7/1971 | Rippon | ......................... | 261/123 |
| 3,671,018 A * | 6/1972 | McKibben et al. | ........... | 366/107 |
| 3,865,908 A * | 2/1975 | Hirshon | ......................... | 261/77 |
| 4,096,709 A * | 6/1978 | Barthel | ......................... | 62/307 |
| 4,136,970 A * | 1/1979 | Cabrera et al. | ................ | 366/101 |
| 4,337,152 A * | 6/1982 | Lynch | .......................... | 210/197 |
| 4,595,296 A | 6/1986 | Parks | | |
| 4,882,099 A * | 11/1989 | Durda et al. | ................... | 261/128 |
| 5,298,164 A | 3/1994 | Hapach et al. | | |
| 5,538,162 A * | 7/1996 | Reh et al. | ......................... | 222/63 |
| 5,592,868 A * | 1/1997 | Asai et al. | ...................... | 99/348 |
| 6,280,636 B1 | 8/2001 | Locklair | | |
| 6,372,140 B2 | 4/2002 | Kelly | | |
| 6,435,209 B1 | 8/2002 | Heil | | |
| 6,629,773 B2 | 10/2003 | Parks | | |
| 6,896,804 B2 | 5/2005 | Haerther et al. | | |
| 7,005,068 B2 | 2/2006 | Hoffland | | |
| 7,282,141 B2 | 10/2007 | Koopmans et al. | | |
| 7,374,675 B2 | 5/2008 | Koopmans et al. | | |

(Continued)

FOREIGN PATENT DOCUMENTS

JP 07-203806 8/1995

*Primary Examiner* — Yogendra Gupta
*Assistant Examiner* — Emmanuel S Luk
(74) *Attorney, Agent, or Firm* — Anthony Claiborne (57) ABSTRACT

A means for mitigating or precluding formation of ice in water stored in large storage tanks generates large mixing bubbles toward the bottom of the tank, causing mixing of thermally stratified layers of water in the tank through turbulence created as the bubbles rise through the tank. Incipient stratification of water along thermoclines is detected and the mixer is engaged only when temperatures of portions of stratified water in the tank approach freezing.

9 Claims, 7 Drawing Sheets

U.S. PATENT DOCUMENTS

| | | |
|---|---|---|
| 7,680,400 B2 * | 3/2010 | Reusche et al. .............. 392/497 |
| 7,853,133 B2 * | 12/2010 | Reusche et al. .............. 392/499 |
| 7,941,040 B2 * | 5/2011 | Reusche et al. .............. 392/499 |
| 2002/0154567 A1 * | 10/2002 | Husher ........................ 366/132 |
| 2003/0131619 A1 * | 7/2003 | Lidman et al. ................. 62/201 |
| 2005/0121645 A1 * | 6/2005 | Prescott ......................... 252/70 |
| 2006/0070948 A1 | 4/2006 | Wickham |
| 2006/0081534 A1 | 4/2006 | Dimitriou et al. |
| 2006/0086662 A1 | 4/2006 | Ogden |
| 2006/0096918 A1 | 5/2006 | Semmens |
| 2006/0124543 A1 | 6/2006 | Pehrson et al. |
| 2006/0254977 A1 | 11/2006 | Koopmans et al. |
| 2008/0270162 A1 * | 10/2008 | Machacek ........................ 705/1 |
| 2009/0207689 A1 * | 8/2009 | Artusi ........................... 366/140 |
| 2009/0277846 A1 | 11/2009 | Koopmans et al. |
| 2009/0279380 A1 | 11/2009 | Koopmans et al. |

* cited by examiner

WATER TANK DEICING MIXER

CROSS REFERENCE TO RELATED APPLICATION

This application claims priority from U.S. provisional application Ser. No. 61/127,376, filed May 12, 2008, entitled WATER SUPPLY MIXING PROCESS.

BACKGROUND OF THE INVENTION

1. Field of the Invention

This invention relates to methods and apparatus to mix thermally stratified potable water supplies to prevent freezing.

2. Description of the Related Art

When a large capacity tank is underutilized, differential thermal conditions in the tank can cause the contents to stratify in thermoclines, where warmer layers of water meet cooler layers. If, as is often the case, a tank with stratified contents is both filled and emptied from a limited portion of the tank, water supplied by the tank will be from recently filled, fresher strata, while the remaining strata in the tank may age, unused and relatively undisturbed. For non-insulated or under-insulated tanks in colder regions during winter months, the aging, unused strata of water in such tanks may lose sufficient heat to freeze. When ice forms in a water storage tank, the effective liquid capacity of the tank is reduced by the volume of ice in the tank. If a sufficient volume of ice is formed, the effective liquid capacity of the tank may be reduced by such an amount that it is not sufficient for water supply needs.

Managers of water supply systems, such as municipalities, have employed various means to minimize formation of ice in water supply tanks, with varying degrees of success. In some systems, heating is used to prevent ice formation. In some such systems, water is heated. In some cases, liquid water from the tank is pumped and circulated through a heat exchanger to raise its temperature. In other cases, at least some of inflowing water is heated during filling of the tank. In yet other cases, steam is injected into the liquid water in the tank to raise its overall temperature. Such water tank heating systems are expensive and require considerable maintenance.

In other systems, small sparging bubbles are provided to water in lower portions of the tank, exchanging heat from the air trapped in the bubbles to the water surrounding them as the bubbles rise through the tank. If the air provided to form the bubbles is significantly warmer than the water through which the bubbles pass, and if a sufficient quantity of air is bubbled through the tank, such sparging can elevate the temperature of some of the liquid water and somewhat reduce ice formation. Because the heat capacity of air is relatively small, however, to be effective such systems must provide a very large volume of sparging bubbles and, preferably, the air forming the bubbles must be heated to a considerably high temperature. For tanks with significant ice formation tendencies, such systems are either ineffective or very expensive.

What is needed is a method of preventing or remediating stratification of water in storage tanks to preclude ice formation in the first place. As will be understood by those in the art, stratification can be obviated by sufficient vertical mixing of water in the tank, mixing warmer water from recent fillings with cooler water from prior fillings. Such mixing can also assist in melting ice already formed from water previously thermally stratified in the tank. The effectiveness of such mixing for ice remediation may be enhanced by providing heat to water that is to be mixed.

A number of means for mixing liquids are available to de-stratify stored water. A mechanical mixer, comprised of a screw or blade that is turned by a motor, is commonly employed to mix various liquids. Mechanical mixers, however, are subject to a number of shortcomings for mixing drinking water in storage tanks.

Mixing the strata in a typical large water storage tank with a mechanical mixer requires a large amount of energy relative to the amount of water that is actually mixed. Further, agitation of the water in the tank by mechanical mixers can disturb sediment settled in the bottom of the tank, resulting in suspended sediment degrading the aesthetics of the water for drinking. Further still, mechanical mixers are often inefficient, mixing some but not all strata in a storage tank. In addition, acquisition costs can be high for a mechanical mixer having sufficient capacity to mix all the strata in a large storage tank. Yet further, costs are high to retrofit an existing water storage tank with a mechanical mixer, retrofitting further often entailing a need to drain the tank or otherwise temporarily remove the tank from the water distribution system. What is needed are more economical and efficient means of mixing water to eliminate stratification with minimal disturbance to sediment in the tank. What is needed further is such means that can be retrofitted to a water storage tank operation economically and without a need to take the water tank off-line.

For economy, it is further desirable that the mixer that is used to obviate stratification be engaged only when needed, i.e. only when thermal stratification is taking place and cooler strata are at risk of freezing. Accordingly, it is desirable to have a means for determining when mixing is needed and for engaging the mixer only at such times.

It is further desirable that the mixer system be easy to install and easy to operate.

BRIEF DESCRIPTION OF THE INVENTION

The present invention provides a means for mixing drinking water stored in large storage tanks, preventing thermal stratification of the water to reduce risk of freezing, by generating large mixing bubbles toward the bottom of the tank, causing mixing of layers of water in the tank through turbulence created as the bubbles rise through the tank. Embodiments of the present invention detect incipient stratification of water along thermoclines and engage the mixer only when temperature of water strata within the tank approach freezing.

BRIEF DESCRIPTION OF THE DRAWINGS

The foregoing objects, as well as further objects, advantages, features and characteristics of the present invention, in addition to methods of operation, function of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE PREFERRED EMBODIMENTS

Figure 1:
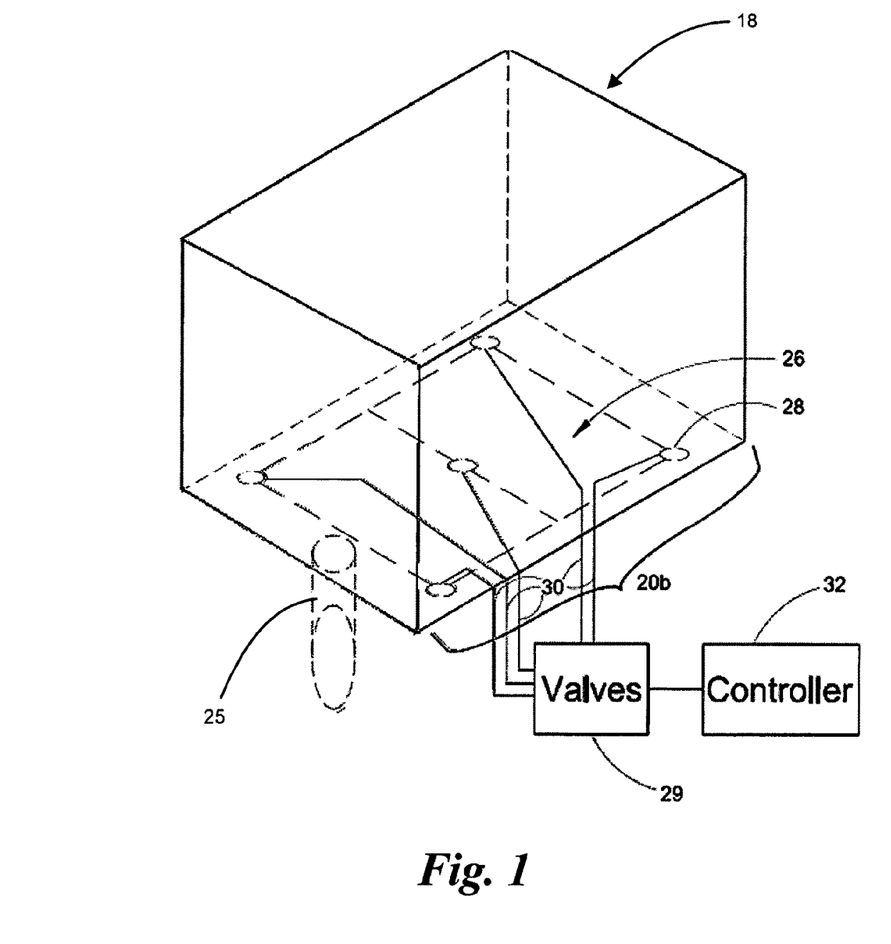
FIG. 1 is a diagram of an embodiment of the present invention in a rectangular storage tank.

FIG. 1 is a perspective view of a water storage tank 18 in which is installed a mixer according to an embodiment of the invention. The tank 18 is filled with drinking water from below by standpipe 25.

Located in tank 18, a mixer 26 injects a gas safe for drinking water, such as air, to generate large mixing bubbles. As further discussed in reference to FIG. 3 below, the mixing bubbles are large enough to move a substantial amount of water as they rise toward the water's surface. For effective and efficient mixing of drinking water, bubbles generated by the present invention should be large, from approximately one half meter to several meters in diameter. The mixing current, resulting from turbulence from displaced water as the large bubbles rise, mixes the water to obviate stratification.

The mixer 26 includes a forming plate 28 to form mixing bubbles from the injected gas, and a valve 29 to permit or prevent the gas from reaching the forming plate 28. The mixer 26 also includes a distribution line 30 to supply the forming plate 28 with the gas when the corresponding valve 29 is open, and a controller 32 to open and close the valve 29. For example, in one embodiment, the mixer 26 includes five forming plates 28, five valves 29, and five distribution lines 30, and the controller 32 includes a memory (not shown) and a processor (not shown) to allow a user to input data to control when and how long each valve.

Figure 2A:
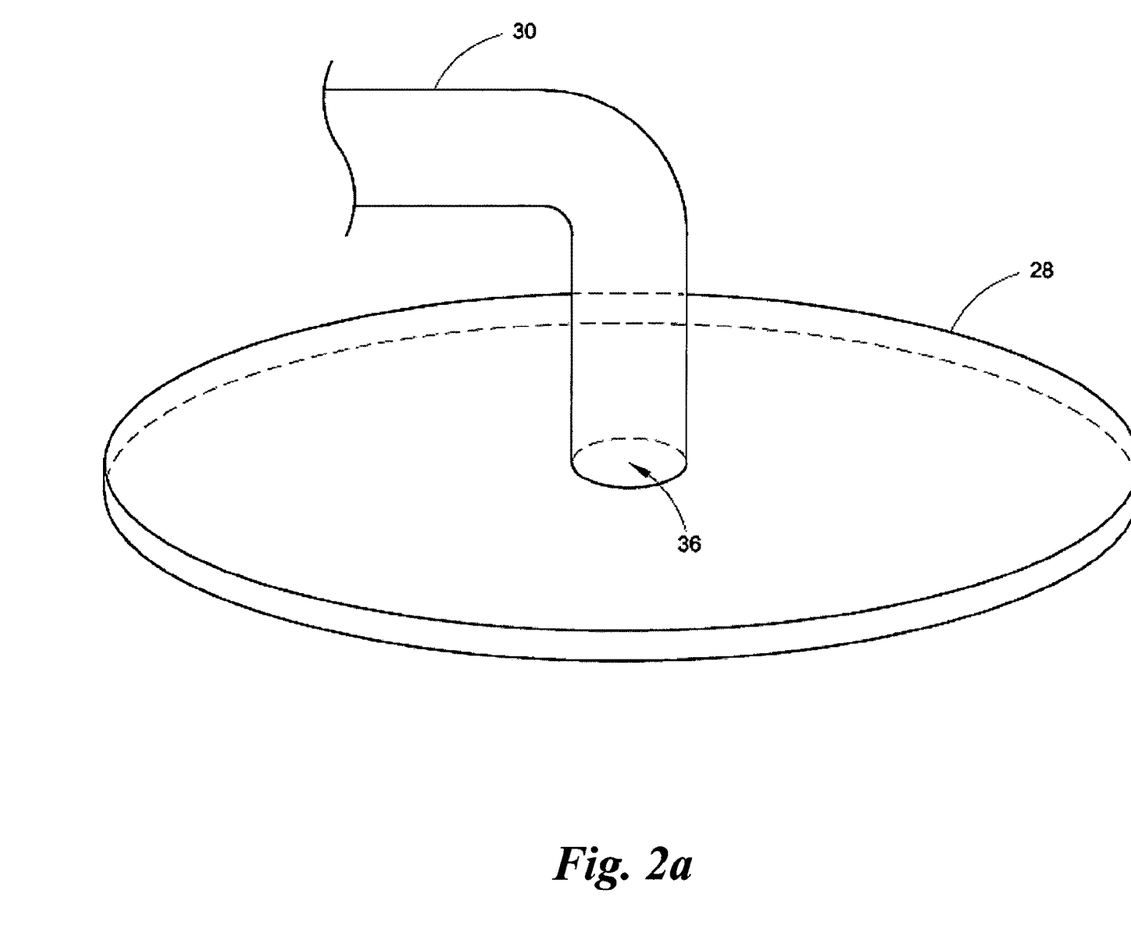
FIG. 2a is a diagram of a bubble forming plate according to an embodiment of the present invention.

Each forming plate 28, one embodiment of which is shown in FIG. 2a, includes an orifice 36. When the valve 29 is opened, air flows through the distribution line 30 toward the forming plate 28, and then exits the distribution line 30 through the orifice 36. The forming plate 28 prevents the air from rising toward the surface of the water until the valve 29 injects more air than the forming plate 28 can hold, at which time most of the air escapes from under the forming plate 28 and forms a large mixing bubble. The large mixing bubble then rises toward the surface of the wastewater. When the valve 29 is closed, air does not flow through the orifice 36.

Figure 2B:
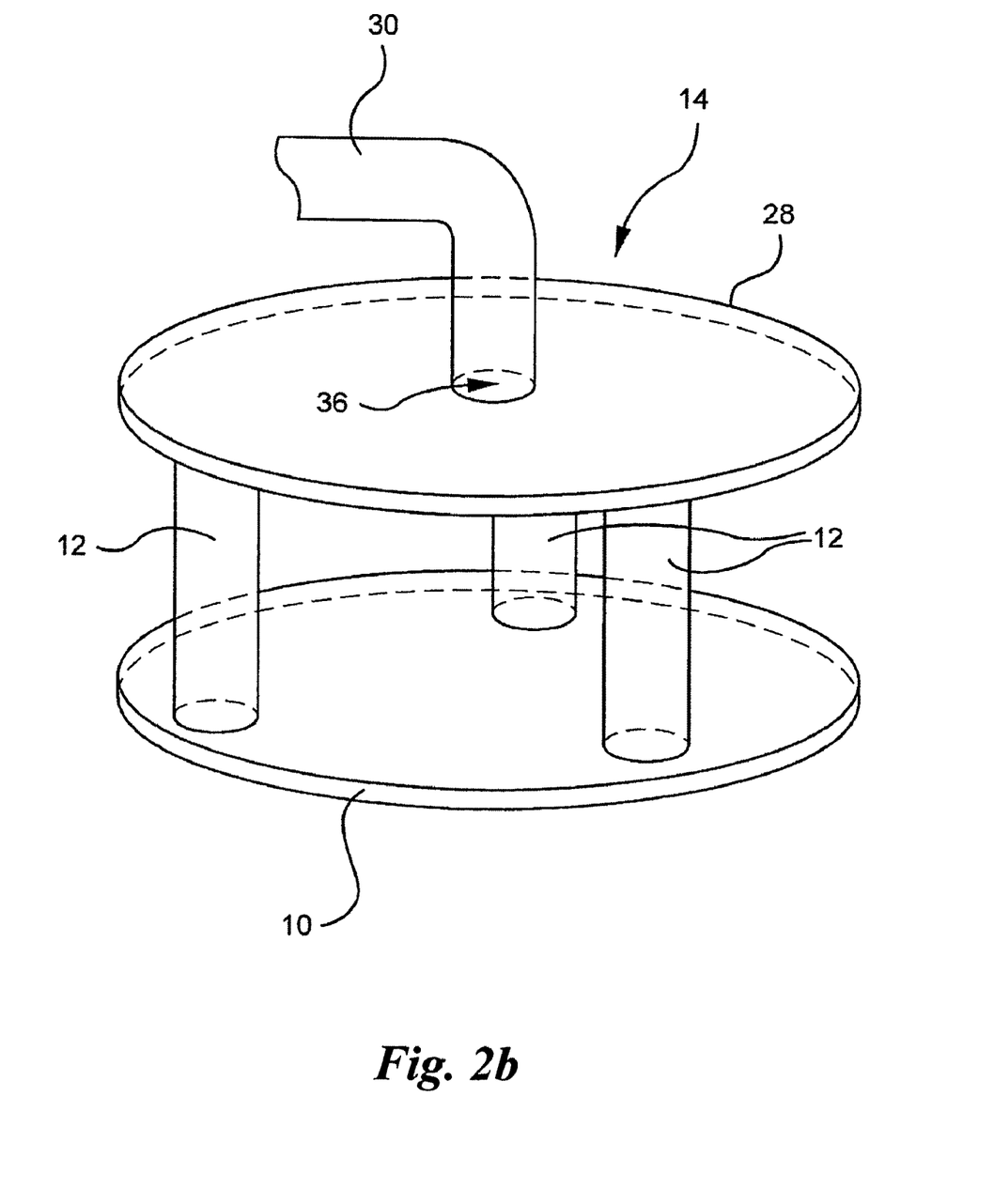
FIG. 2b is a diagram of an alternative embodiment of a bubble forming plate.

By outfitting with strong, permanent magnets, plates 28 may be installed in an active, filled water storage tank that is comprised of ferromagnetic material. In such a case, distribution lines 30 are flexible and plates 28 are simply dropped into tank 18. Referring now to FIG. 2b, illustrated is plate assembly 14, comprising plate 28 operatively connected to flexible distribution line 30. Plate 28 is further attached to permanent flat magnet 10 via support legs 12, providing a space between plate 28 and magnet 10, thereby elevating forming plate 28 some distance above the bottom of tank 18 so that movement of bubbles from the underside of plate 28 is sufficiently distant from the tank bottom so as not to disturb sediment in the bottom of tank 18. As will be appreciated by those of skill in the art, the required length of support legs 12 will vary depending upon the depth and density of sediment in tank 18. In embodiments using magnets for this purpose, it is important that magnet 10 be sufficiently strong to retain plate assembly 14 on the bottom of tank 18 against the buoyancy of both distribution line 30 and plate assembly 14 when large bubbles are formed on the underside of plate 28.

Figure 3:
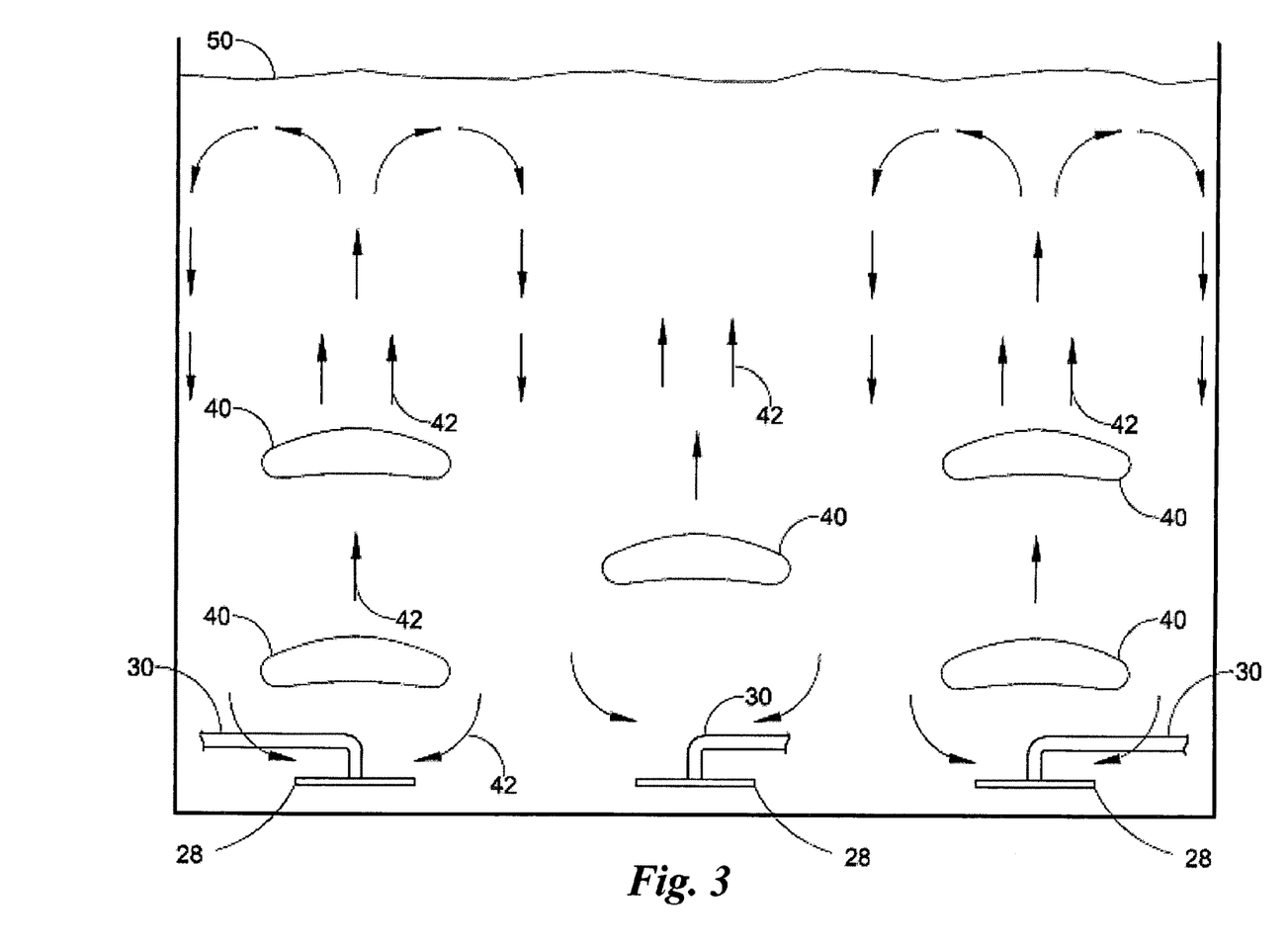
FIG. 3 is a diagram illustrating mixing of drinking water in a storage tank by turbulence caused by rising bubbles according to an embodiment of the invention such as illustrated in FIG. 1.

FIG. 3 illustrates the mixing caused by the large bubbles generated by a mixer such as that illustrated in FIG. 1. The mixing bubbles 40 generate the mixing currents indicated by the arrows 42 (28 arrows shown but only 5 labeled with the reference number 42 for clarity) that mix the water 50. The strength of the mixing currents 42 depends on the size of each bubble 40 and the speed at which each mixing bubble 40 travels through the water and the speed at which each mixing bubble 40 travels through the water. Small bubbles, such as generated by prior art sparging systems, effectively generate no mixing currents. Large bubbles generated by the present invention can generate strong currents effective to cause considerable mixing of the water.

The speed of the mixing bubble 40 depends on the density of the gas employed in the invention relative to the density of water 50, and the bubble's shape. The greater the difference between the densities of water 50 and the gas, the faster the mixing bubbles 40 rise through water 50. The more aerodynamic the shape of the bubble 40 becomes the faster the bubble 40 rises through water 50. For example, in one embodiment, the bubble 40 forms an oblate spheroid—a sphere whose dimension in the vertical direction is less than the dimension in the horizontal direction. In other embodiments, the bubble 40 forms a squished sphere having the trailing surface—the surface of the bubble 40 that is the rear of the bubble 40 relative to the direction in which bubble 40 moves—that is convex when viewed from the direction that the bubble 40 moves.

The size of the mixing bubble 40 depends on the flow rate of the gas into water 50. The flow rate depends on the size of the orifice 36 and the gas's injection pressure. As one increases the gas injection pressure, one increases the amount of gas injected into water 50 over a specific period of time that the valve 29 is open. And, as one increases the area of the orifice 36, one increases the amount of gas injected into water 50 over a specific period of time that the valve 29 is open. As one increases the diameter of the forming plate 28 one increases the amount of gas the forming plate 28 can hold before the gas escapes it. For example, in one embodiment the size of the bubble 40 is approximately 0.5 meters across its largest dimension. In other embodiments, the bubble 40 is approximately 3 meters or greater across in largest dimension.

Figure 4:
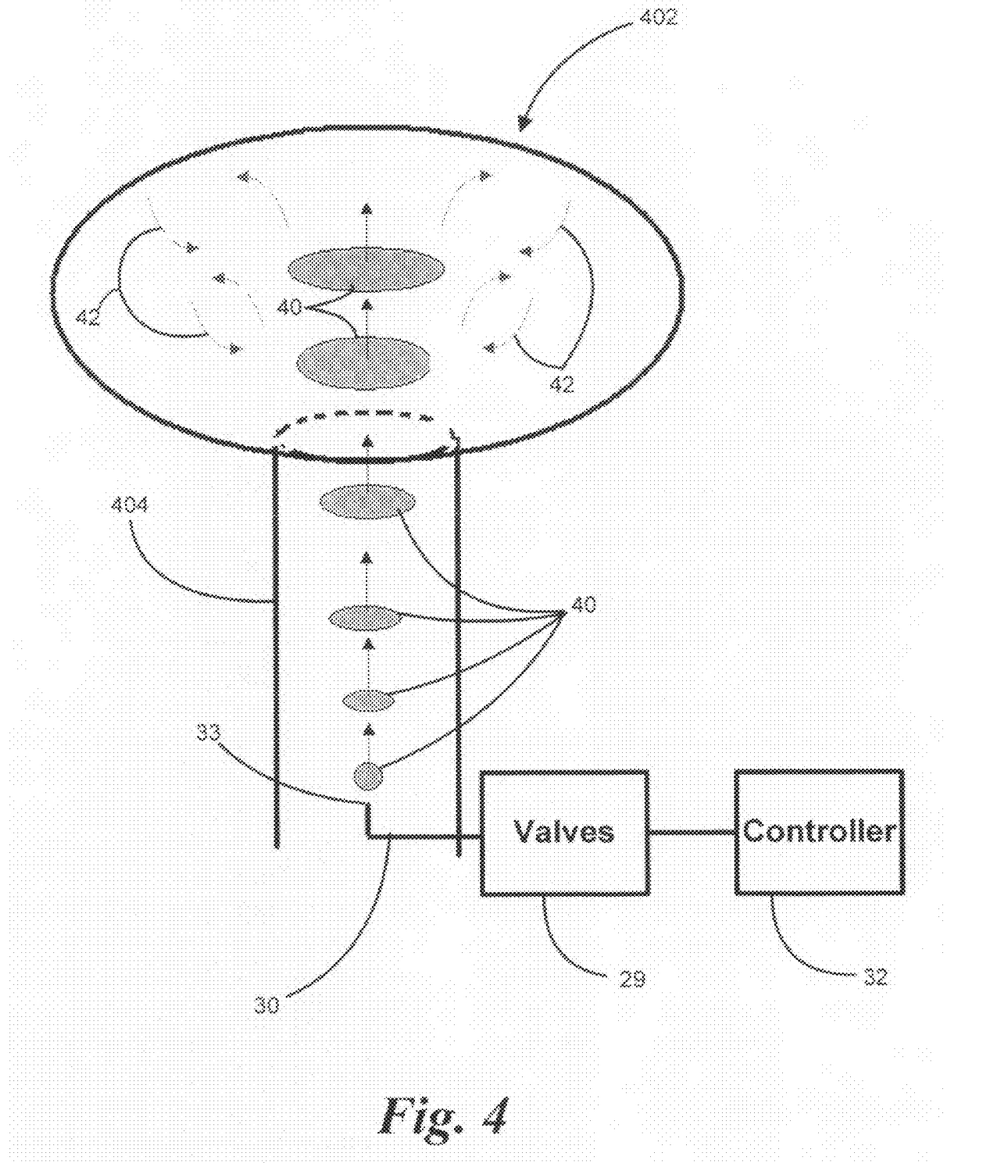
FIG. 4 is a diagram illustrating an alternative embodiment of the present invention.

FIG. 4 illustrates an alternative embodiment of the present invention. In this embodiment for elevated oblate spheroid water tank 402, valves 29 under control of controller 32 provide a supply of pressurized gas through distribution line 30, which disperses the pressurized gas through orifice 33 into the lower portion of tank inlet standpipe 404. Because of the high pressure of the head of water over the lower portion of standpipe 404, bubbles 40 emitted at orifice 33 are initially small and spherical. However, as they rise through standpipe 404 to enter tank 402, the pressure diminishes with diminishing head of water and bubbles 40 therefore become larger, assuming an oblate shape as they travel upward. As will be appreciated by those in the art, this growth in size of bubbles 40 is more pronounced the lower orifice 33 is placed in tank standpipe 404 and the higher the pressure and rate of gas delivered by orifice 33 to water in the tank. By the time bubbles 40 enter tank 402, they have become large, on the order of 0.5 to 3 or more meters in diameter along the largest dimension, providing mixing currents as indicated by arrows 42 just as in the embodiment discussed in reference to FIG. 3.

For some tanks 402, standpipe 404 serves as both an inlet and an outlet pipe. Preferred operation of the present invention takes place when there is no net outflow in standpipe 404. Accordingly, for such tanks, it is preferred to add a sensor (not illustrated) for water flow in standpipe 404 so that controller 32 opens valves 29 to provide pressurized gas to tank 402 only when there is no net outflow from the tank in standpipe 404.

Figure 5:
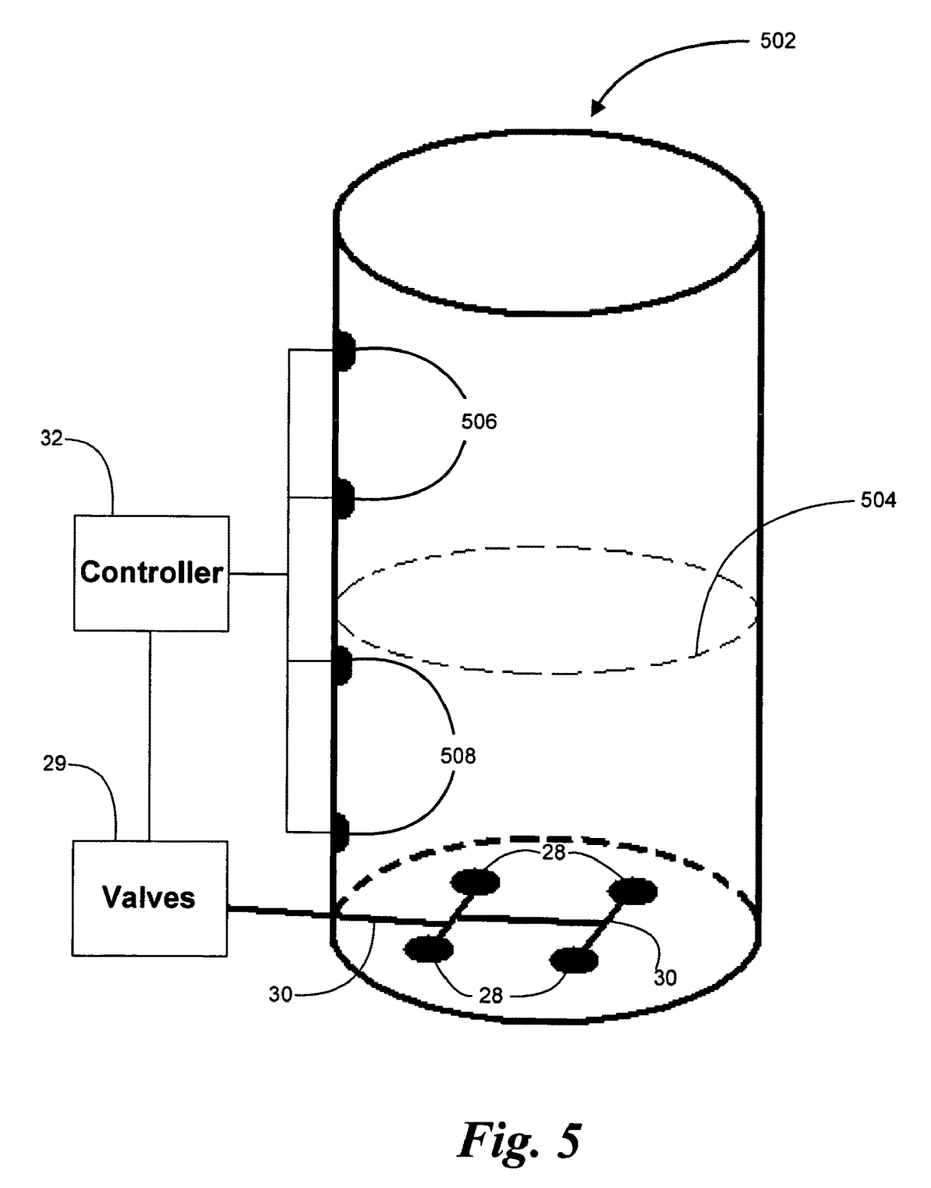
FIG. 5 is a diagram illustrating a thermocline detection arrangement according to an embodiment of the invention.

FIG. 5 illustrates a cylindrical tank 502 in which a thermocline 504 has developed. Embodiments of the present invention detect the presence of thermocline 504 by comparing temperature readings from sensors 506, 508. The presence of thermocline 504, separating strata of water in tank 502 is indicated by significant difference between temperature readings from sensors 506 located in the upper portion of tank 502 and sensors 508 located in the lower portion of tank 502. While the actual value of a temperature difference indicating a thermocline will vary with tank configuration, prevailing weather conditions, etc., a temperature difference of 4 to 10 degrees C. between different levels of water in the tank may indicate the presence of thermocline 504. When the environmental temperature is below the temperature of inlet water, older strata will be colder than strata comprised of water from more recent fillings. Under such conditions, since depicted tank 502 is filled from the bottom, with the development of thermocline 504 water below thermocline 504, comprised in part of water from recent fillings, will be warmer than the water above thermocline 504, comprised mostly of water from earlier fillings which has lost heat through tank 502 to the environment. As will be appreciated by those of skill in the art, such thermal inversions are commonly observed in bottom-filled tanks when the environmental temperature drops to approximately 36 deg. Fahrenheit or below.

When the temperature of colder strata approaches freezing, risk of ice formation is present. In the depicted embodiment, when the difference in temperature indicated by upper sensors 506 and lower sensors 508 indicate the presence of a thermocline and the temperature indicated by an upper sensor 506 approaches freezing, controller 32 directs valves 29 to provide pressurized gas to supply line 30, providing gas to form bubbles under plates 28 as discussed above in reference to FIG. 1.

As will be appreciated by those of skill in the art, sensors 506, 508 may be any form of electronic sensor, such as a thermistor, capable of measuring temperatures in the range of 0 to 100 degrees C. For tanks comprised of ferromagnetic material, sensors 506, 508 may comprise a means of magnetic adhesion, for ease of installation. For tanks without substantial thermal insulation, temperature sensors 506, 508 may adhere to the exterior of tank 502.

Figure 6:
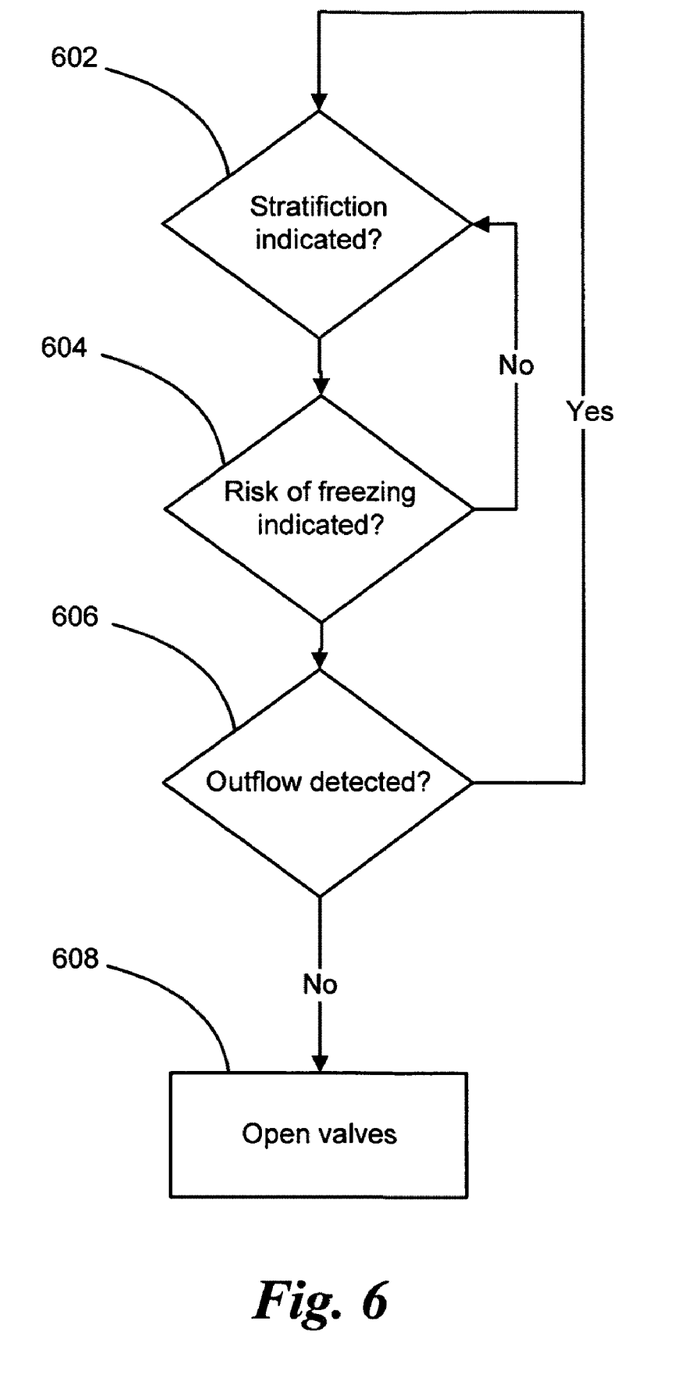
FIG. 6 is a flow chart for operation of an embodiment of the invention.

FIG. 6 is a flow chart for operation of an embodiment of the invention for tanks having a single standpipe for inlet and outlet of water, such as that depicted in FIG. 5. If sensors indicate stratification 602 and sensors further indicate risk of freezing 604 in at least one stratum, valves are opened 608 only if no outflow is detected 606.

Although the detailed descriptions above contain many specifics, these should not be construed as limiting the scope of the invention but as merely providing illustrations of some of the presently preferred embodiments of this invention. Various other embodiments and ramifications are possible within its scope, a number of which are discussed in general terms above.

While the invention has been described with a certain degree of particularity, it should be recognized that elements thereof may be altered by persons skilled in the art without departing from the spirit and scope of the invention. Accordingly, the present invention is not intended to be limited to the specific forms set forth herein, but on the contrary, it is intended to cover such alternatives, modifications and equivalents as can be reasonably included within the scope of the invention. The invention is limited only by the following claims and their equivalents.

We claim:

1. A process for mitigating ice accumulation in a supply of water in a storage tank, comprising:
   determining whether water has stratified in the tank;
   if water has stratified in the tank, determining whether the temperature of at least one stratum is below a first pre-determined temperature value;
   responsive to the determination that water has stratified in the tank and the temperature of at least one stratum is below the first pre-determined value, releasing at least one large mixing bubble to rise through the standpipe into the tank,
   whereby the rising of the at least one large mixing bubble generates currents in the water to mix and destratify the water supply.

2. A process according to claim 1, wherein the step of determining whether water has stratified in the tank comprises determining whether the temperature of the tank contents at a lower vertical level differs from the temperature of the tank contents at a higher vertical level by more than a second pre-determined temperature value.

3. A process according to claim 2, wherein the second pre-determined temperature value is equal to or greater than 5 degrees Fahrenheit.

4. A process according to claim 1, wherein the first pre-determined temperature value is less than 36 degrees Fahrenheit.

5. A system to mitigate ice formation in a supply of water in a storage tank, the system comprising
   a means for determining whether the water supply is thermally stratified;
   a means for determining whether a portion of the water supply is below a pre-determined temperature; and
   a means, responsive to the determination that the water supply is thermally stratified and that a portion of the water supply is below a pre-determined temperature, to release at least one large mixing bubble near the bottom of the tank,
   whereby the rising of the at least one large mixing bubble generates currents in the water to mix the water supply and thereby destratify it.

6. A system according to claim 5, wherein the pre-determined temperature is less than 36 degrees Fahrenheit.

7. A system according to claim 5, wherein:
   the means for determining whether the water supply is thermally stratified and the means for determining whether a portion of the water supply is below a per-determined temperature together comprise a plurality of temperature sensors at different vertical levels in the tank, the sensors in communication with a controller; and
   the means for releasing at least one large mixing bubble comprises:
   a supply of pressurized gas;
   a forming plate affixed to the bottom of the tank;
   an injector having an orifice affixed to the plate, the orifice opening on the bottom of the plate;
   a gas supply line from the supply of pressurized gas to the injector; and
   a valve interposed in the gas supply line between the supply of pressurized gas and the injector, the valve, in response to a signal from the controller, operative to supply a pulse of pressurized gas from the supply of pressurized gas to the injector.

8. An apparatus to mitigate ice formation in a supply of water in a storage tank, comprising
- a plurality of temperature sensors at varying vertical positions in the tank;
- a controller receiving temperature data from the plurality of temperature sensors;
- a supply of pressurized gas;
- at least one forming plate affixed to the bottom of the tank;
- an injector having an orifice affixed to each forming plate, the orifice opening on the bottom of the plate;
- a gas supply line from the supply of pressurized gas to the injector; and
- a valve interposed in the gas supply line between the supply of pressurized gas and the injector, the valve, in response to a signal from the controller, operative to supply a pulse of pressurized gas from the supply of pressurized gas to the injector,
    - whereby, when the temperature data received by the controller from the sensors indicates the temperature at a first vertical position in the tank differs from the temperature at a second vertical position in the tank by a first pre-determined value, and the temperature in at least one vertical position in the tank is less than a second pre-determined value, the controller sends a signal to open the valve to supply a pulse of pressurized gas to the injector, thereby forming a large bubble to rise through the tank, generating currents to mix and destratify the water.

9. A process for mitigating ice accumulation in a supply of water in a storage tank, comprising:
- determining whether water has stratified in the tank;
- if water has stratified in the tank, determining whether the temperature of at least one stratum is below a first pre-determined temperature value;
- responsive to the determination that water has stratified in the tank and the temperature of at least one stratum is below the first pre-determined value, releasing at least one large mixing bubble to rise through the standpipe into the tank, and
- repeating the aforesaid steps until it is determined that the water supply is destratified.

* * * * *